(12) United States Patent
Zee et al.

(10) Patent No.: US 8,792,345 B2
(45) Date of Patent: Jul. 29, 2014

(54) METHOD AND APPARATUS FOR PROVIDING ACCESS TO PUBLIC PACKET NETWORKS FROM A LOCAL ENVIRONMENT

(75) Inventors: Oscar Zee, Stockholm (SE); Hannes Medelius, Bagarmossen (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 15 days.

(21) Appl. No.: 13/521,344

(22) PCT Filed: Jan. 14, 2010

(86) PCT No.: PCT/SE2010/050032
§ 371 (c)(1),
(2), (4) Date: Jul. 10, 2012

(87) PCT Pub. No.: WO2011/087415
PCT Pub. Date: Jul. 21, 2011

(65) Prior Publication Data
US 2012/0300631 A1   Nov. 29, 2012

(51) Int. Cl.
*H04L 12/28* (2006.01)
(52) U.S. Cl.
USPC ........................................ 370/230.1; 370/235
(58) Field of Classification Search
USPC ......... 370/229–232, 235, 236, 329, 400, 401, 370/464–468
See application file for complete search history.

(56) References Cited

U.S. PATENT DOCUMENTS

2005/0190747 A1   9/2005   Sindhwani et al.
2010/0122338 A1*  5/2010   Kataoka et al. ................. 726/12
2010/0128709 A1*  5/2010   Liu et al. ....................... 370/338
2010/0169937 A1*  7/2010   Atwal et al. ..................... 725/68
2010/0296498 A1* 11/2010   Karaoguz et al. ............. 370/338

FOREIGN PATENT DOCUMENTS

EP   1515484 A1   3/2005
EP   2043305 A1   4/2009

OTHER PUBLICATIONS

Written Opinion, PCT Application No. PCT/SE2010/050032, Sep. 28, 2010, (5 pages).
International Search Report, PCT Application No. PCT/SE2010/050032, Sep. 28, 2010, (4 pages).
T. Ernst; "Goals and Benefits of Multihoming" draft-multihoming-generic-goals-and-benefits-00; Feb. 9, 2004, (16 pages).
Berg et al.; "A Concept for Public Access to Privately Operated Cooperating Local Access Points" 2005 IEEE 61st Vehicular Technology Conference. VTC2005—Spring—May 30-Jun. 1, 2005—Stockholm, Sweden, 20050530-20050501; vol. 5, (pp. 2959-2963.).
Xie et al.; "A Survey of Mobility Management in Hybrid Wireless Mesh Networks" IEEE Service Center, New York, NY, US Nov. 1, 2008; vol. 22, NR 6, (pp. 34-40).

* cited by examiner

*Primary Examiner* — Kerri Rose
(74) *Attorney, Agent, or Firm* — Myers Bigel Sibley & Sajovec, PA

(57) ABSTRACT

One or more mobile devices capable of establishing wireless communication a public packet network independently of a network access device in a local environment is used to provide additional bandwidth for the local environment. Some traffic that would normally be routed over the backhaul connected to the network access device, such as a fixed wireless terminal, is sent to the mobile device and after address translation sent to the public network over the backhaul connection associated with the mobile device.

17 Claims, 5 Drawing Sheets

METHOD AND APPARATUS FOR PROVIDING ACCESS TO PUBLIC PACKET NETWORKS FROM A LOCAL ENVIRONMENT

CROSS-REFERENCE TO RELATED APPLICATION

This application is a 35 U.S.C. §371 national stage application of PCT International Application No. PCT/SE2010/050032, filed on Jan. 14, 2010, the disclosure and content of which is incorporated by reference herein as if set forth in its entirety. The above-referenced PCT International Application was published in the English language as International Publication No. WO 2011/087415 A1 on Jul. 21, 2011.

FIELD OF THE INVENTION

This invention relates the field of packet networks, and in particular to a method and apparatus for providing access to a public packet network from a local environment, such as a residence or office.

BACKGROUND OF THE INVENTION

The provision of broadband services, such as high speed Internet, to small office and home office and residential environments is becoming increasingly important in today's highly interconnected world. One way of providing such services is to use existing telephone infrastructure, cable or fiber optics. A cost efficient alternative to wired services is fixed wireless access (FWA). In FWA systems, the end user is provided with a fixed wireless terminal and offered broadband access using a variety of wireless technologies, such as GSM, WCDMA, SAE/LTE, CDMA or WiMAX.

Fixed wireless terminals, as the name implies, are intended to remain in one location and communicate with a particular transmitter. Such terminals are generally not designed to be moved to another location without being powered off and then powered on again. They are limited to the bandwidth available over the wireless network, and this bandwidth is subject to performance degradation when usage is high.

SUMMARY OF THE INVENTION

Many households also have mobile devices, such as mobile phones, or wireless handheld devices, which unlike fixed wireless terminals, are intended to be moved over a wide area while maintaining connectivity through the cellular network. Embodiments of the invention allow the performance of the broadband connection in a local environment, such as a local area network (LAN), to be enhanced by sharing bandwidth with one or more mobile devices present in the local environment.

According to the present invention there is provided a method of providing access to a public packet network from a local environment, comprising: establishing a link between a network access device and said public packet network for transferring packets between said network access device and said public packet network; establishing a link between said network access device and one or more user devices within said local environment for transferring packets between said network access device and said one or more user devices; and establishing a link within said local environment between said network access device and one or more mobile devices capable of establishing wireless communication with said public packet network independently of said network access device; and wherein said network access device routes at least some of the traffic flow between said one or more end user devices and said public packet network via said one or more mobile devices to increase the effective bandwidth capability of the network access device.

The network access device may be a fixed wireless terminal connected to the public network, such as the Internet, over a wireless link, or alternatively it may be a terminal device, such as a router, connected to the Internet over a wired connection, for example, using xDSL, or over a fiber optic link. The wireless device may typically be connected to a radio access network (RAN) or cellular network. In the case of a fixed wireless terminal, it may access the same RAN as the one or more mobile devices, or in the alternative, it may use an entirely different wireless network, such as WiMax, for example.

The local environment is typically a home network, which may consist of a wireless LAN and/or Ethernet LAN, or alternatively it may just be a single device, such as a PC connected to the network access device. The additional bandwidth offered by the mobile device(s) can be utilized by the local network when the mobile device(s) is/are attached to the home network to increase overall bandwidth. A load balancing module, typically in the network access device, determines how the traffic destined for the public network, such as the Internet, is routed, i.e. whether it is sent directly over the backhaul attached to the network access device, or via one of the available mobile devices.

In one embodiment, a tunnel connection is established between the network access device, which may be a fixed wire terminal (FWT), and one or more mobile devices. (Network Address Translation) traversal is performed on the mobile device(s) and a load balancing routine is executed on the FWT. The FWT is also capable of performing Network Address Translation.

The or each mobile device is typically a mobile phone or any other type of handheld device connected to a cellular network using any suitable technology for mobile devices capable of transporting data, such as GSM, EDGE, 3G, HSPA etc. It could also be a laptop or other form of computer connected to the mobile network independently of the fixed wireless access terminal, for example, using a USB cellular access modem. The invention can be implemented with one or several such devices. When several mobile devices are available, the network access device advantageously includes a selection module for selecting which mobile device to use when routing a packet via a wireless backhaul. Preferably, all packets belonging to the same session are routed through the same device.

Embodiments of the invention thus provide a load balancing function between the backhaul connection offered by the network access device, e.g. a fixed wireless terminal, and the backhaul connection offered by the mobile device(s) when the mobile device(s) is/are attached to the local network provided by the fixed wireless terminal. The mobile device(s) can be connected either by wireless or wired link to the local network.

According to another aspect of the invention there is provided a network access device for providing access to a public packet network from a local environment, comprising: a first port configured to establish a link between said network access device and said public packet network for transferring packets between said network access device and said public packet network; a second port configured to establish a link between said network access device and one or more user devices within said local environment for transferring packets between said network access device and said one or more user devices; and wherein the network access device is configured to establish a link within said local environment between said network access device and a mobile device capable of establishing communication with said public packet network independently of said network access device, and to route at least some of the traffic flow between said one or more end user devices and said public packet network over said link to said mobile device to increase the effective bandwidth capability of the network access device.

It will be understood that the network device may be capable of establishing links to more than one mobile device, in which case the load balancing module selects which mobile device to forward packets to increase effective bandwidth. In one embodiment the load balancing module maintains a table of available mobile devices along with their current usage.

According to a still further aspect of the invention there is provided a mobile device capable of providing auxiliary access to a public packet network from a local environment, comprising: a transceiver for establishing a link between said mobile device and said public packet network; said mobile device being configured to establish a link within said local environment between said mobile device and a network access device attached to a local area network and a public packet network; and a network address translator for translating between addresses on said public packet network and said local area network, whereby said mobile device is configured to forward packets between the public packet network and said network access device to increase the effective bandwidth capability of the network access device.

BRIEF DESCRIPTION OF THE DRAWINGS

The invention will now be described in more detail, by way of example only, with reference to the accompanying drawings, in which.

DETAILED DESCRIPTION OF THE INVENTION

While the invention will be described in the context of a network access device in the form of a fixed wireless terminal connected to the public network over a wireless link, it will be appreciated that it is not necessary for the link to be wireless. The network access device could also be connected to the Internet over a wired or fiber optic connection.

One example of a suitable fixed wireless technology is known as SAE/LTE (System Architecture Evolution/Long Term Evolution), and will be used for illustrative purposes only, but it will be understood that the invention is not restricted to the use of SAE/LTE, and any other suitable fixed wireless technology may be employed.

Figure 1:
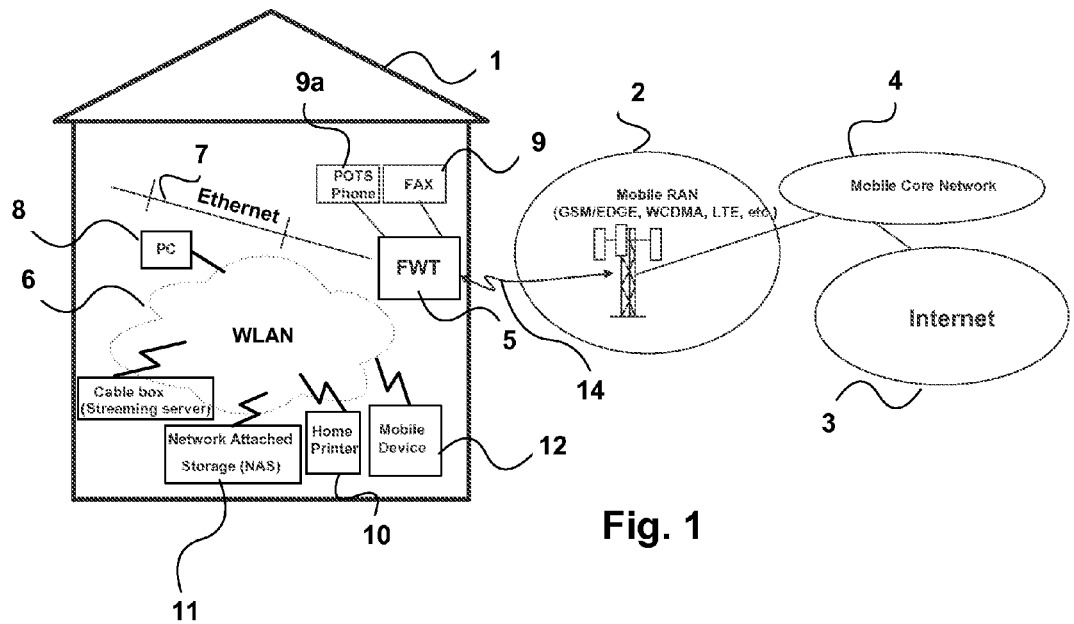
FIG. 1 is a schematic diagram showing a typical fixed wireless system.

FIG. 1 illustrates a local environment connected to the Internet using fixed wireless technology. The local environment is in the form of a home network 1 provided by an Ethernet LAN 7, a wireless LAN 6 and a fixed wireless terminal (FWT) 5. The FWT 5 in this case is connected over a backhaul 14 in the form of a wireless link to a service provider's mobile network or RAN 2 employing any suitable technology, such as GSM/EDGE, WCDMA, 3G, LTE etc. The RAN 2 is in turn connected to the Internet 3 via the service provider's mobile core network 4.

The FWT 5 provides local connectivity and services for the end user equipment located in the home, or one or more mobile devices (e.g. smart phone or laptop with built-in mobile broadband) using for example WLAN/WiFi or Ethernet as the media. Various end user devices, such as a PC (laptop) 8, fax 9, printer 10, storage device 11 can be attached to the home network. In addition, the home network may, for example, support a conventional POTS (Plain Old Telephone Service) telephone 9a.

The setup described so far is conventional and will be understood by one skilled in the art.

The FWT 5, which is located in the end user's home, normally remains in the same location. The FWT 5 has no real mobility except that it does have nomadicity meaning that it can be powered off in one place, moved to another location and then powered on again within the same local environment.

Figure 2:
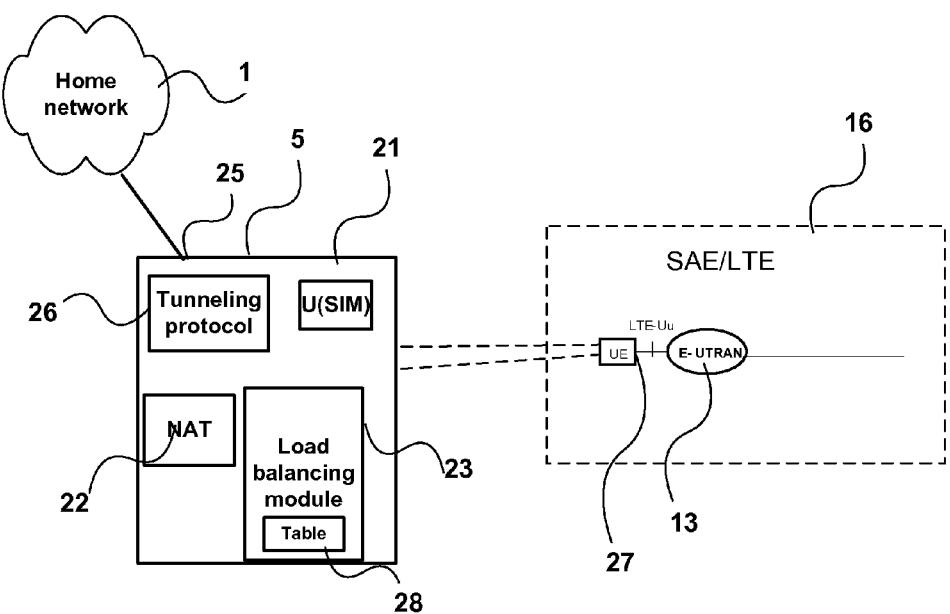
FIG. 2 is a block diagram showing a fixed wireless terminal connected to an SAE/LTE wireless system as end user equipment.

FIG. 2 shows how the FWT 5 logically forms the user equipment UE forming part of the RAN 2. The UE is connected to the E-UTRAN (Evolved Universal Terrestrial Radio Access Network) network 13, forming part of the SAE/LTE architecture 16, via a port 27, which may consist of a wireless transceiver. The FWT 5 also serves as the home gateway and is connected to the wireless LAN and local Ethernet via a port 25 which may consist of a wireless transceiver or an Ethernet port or both. The SAE/LTE architecture is described in detail in the document TS 23.401 V83.0 of the 3rd Generation Partnership (3GPP) project and will be well known to one skilled in the art.

The FWT 5 also contains an (U)SIM card 21 in the same way as mobile handsets and terminals to allow it to connect to the mobile operator's network, a network address translator 22, and a load balancing module 23, which implements a load balancing function, and tunneling protocol 26 for creating a tunnel over the LAN to one or more mobile devices. The function of the load balancing module 23 is to determine whether to route a data packet via the FWT backhaul 14 or via a mobile device with independent packet network connectivity. If there is more than one mobile device with packet network connectivity, the load balancing module 23 selects the particular mobile device through which to route the data packet based on load considerations.

The load balancing module 23 contains a table 28 containing entries for the FWT 5 and the available mobile devices with public packet network connectivity. The load balancing module 23 determines whether a packet should be routed over a wireless backhaul using the FWT 5 or one of the mobile devices, based on the current load of the FWT 5 and the one or more mobile devices. The packet and subsequent packets forming part of the same session are then routed through the selected device. The load balancing module keeps a record in its table 28 of which mobile device(s) and/or FWT 5 itself are currently in use so that it can spread the load as much as possible. For example, if FWT 5 is handling the packets of a session from a particular home device, the load balancing module 23 will select another mobile device 12 that is not currently in use when another session from any home device is setup.

Figure 3:
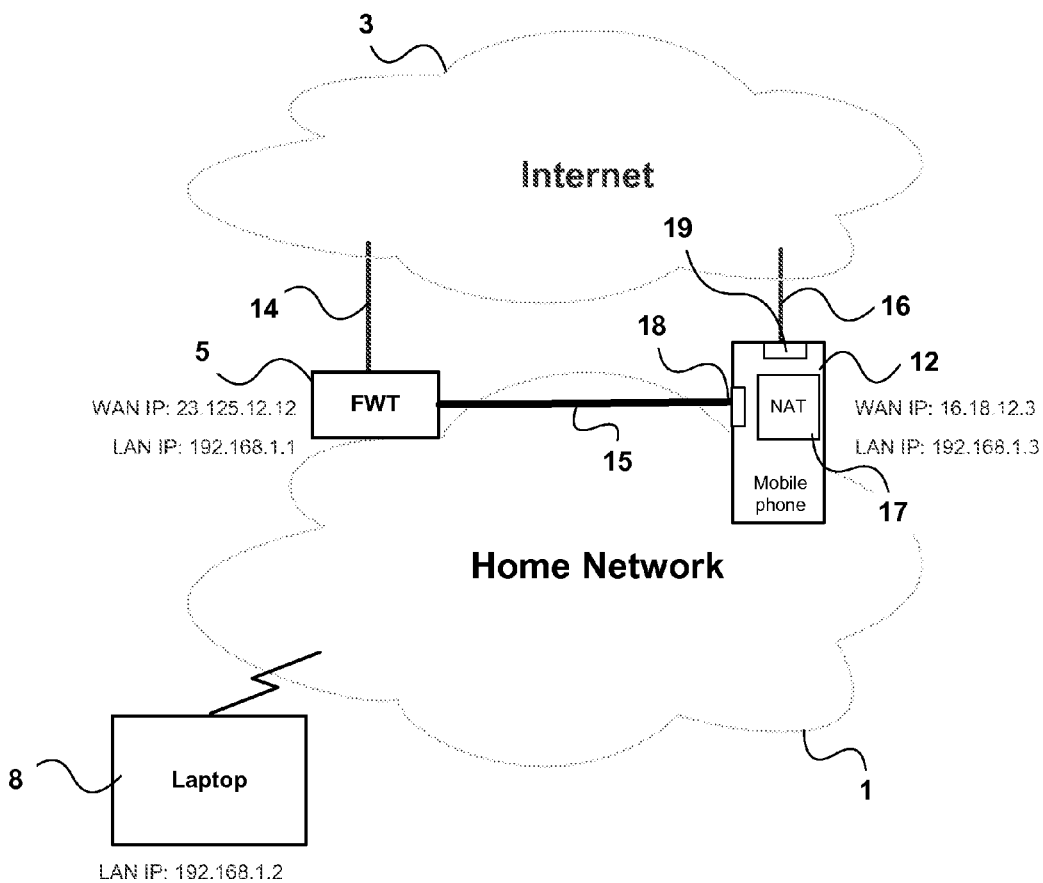
FIG. 3 is a schematic diagram showing a home network connected to the Internet using a fixed wireless terminal and a mobile device in accordance with an embodiment of the invention.

FIG. 3 shows the home network 1 connected to the Internet 3 over backhaul 14, which in this example is a fixed wireless link, although as noted it could also be a wired or fiber optic link. The FWT 5 is also connected to the mobile device(s) 12 over a tunnel 15, which can be established over a wireless or a wired link, such an Ethernet link.

The or each mobile device 12 is also connected over its own backhaul 16 via the radio access network 2 (although RAN 2 is not shown in FIG. 3) to the Internet independently of the backhaul 14 connecting the FWT 5 to the Internet.

The or each mobile device 12 also includes its own NAT module 17, tunneling protocol module 18, and transceiver 19 for accessing the public wireless network.

The FWT 5 can exchange data between the local network 1 and the Internet 3 via its own wireless backhaul 14 in the case of data originating from or destined for the local network in a known manner. Likewise the or each mobile device 12 can exchange data between its own application layers and the Internet 3 via its own wireless backhaul 16 in a known manner.

In accordance with embodiments of the invention, data originating from the home network 1 can also be sent to the Internet 3 via the mobile device(s) and vice versa in order to increase bandwidth capacity for the local network. In this case, NAT traversal will be required as explained below in more detail.

Figure 4:
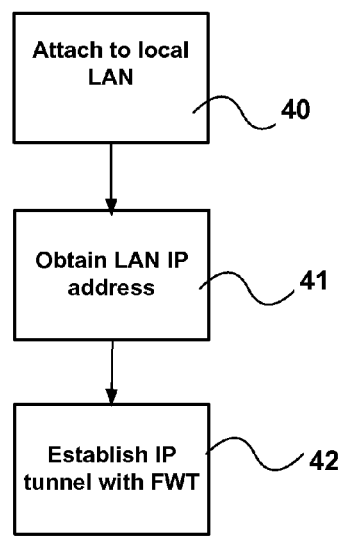
FIG. 4 is a flow chart illustrating the setup of the mobile device.

As illustrated in FIG. 4, when the or each mobile device 12 is introduced into the local environment, it attaches itself to the local LAN at step 40 using WiFi or other suitable technology. Alternatively, it can be connected by a wired connection, such as Ethernet.

When the or each mobile device 12 becomes attached to the home LAN 1, in the same way as any other home device, either via Ethernet or wireless LAN, for example, WiFi, the or each mobile device 12 will retrieve a local LAN IP address, in this example 192.168.1.3, the corresponding network mask and gateway address from the FWT 5, via e.g. DHCP step 41. Finally at step 42 the mobile device 12 establishes an IP tunnel 15 to the FWT 5 over the home LAN. The mobile device 12 can at this stage access the end user equipment located on the home network using its local LAN IP address. For example, when the mobile device 12 receives a packet from its own application layers whose destination address is on the home network, the mobile device sends the packet to the destination using as the source address the LAN IP address of the mobile device 12. When the destination address is on the Internet, the mobile device 12 sends the packet to the Internet using as the source address the WAN IP address of the mobile device.

When the mobile device 12 becomes attached to the WLAN, it might need security settings (e.g. SSID, pass phrase etc) in order to attach to the network. These security settings can either be set manually or automatically as is known in the art.

The mobile device establishes the tunnel 15 towards the FWT 5 using any IP or Ethernet tunneling protocol, such as PPPoE, IPsec/IKEv2, PPTP, L2TP, etc. One example can be IP in IP encapsulation, and the protocol for setting up the tunnel can be a simple ping packet from mobile device towards FWT 5 encapsulated in the tunnel 15. The settings of the tunnel can either be done manually on the FWT 5 and mobile device 12 or automatically.

The FWT 5 will have its own WAN IP address, in this example, 23.125.12.12 for access to the Internet, and LAN IP address 192.68.1.1 for access to the home network 1. The mobile device 12 has its own WAN IP address 16.18.12.3 for connection to the wireless network 2 over backhaul 16 independently of the FWT 5. As noted, there may be a plurality of mobile devices 12, in which case each has its own WAN IP address for connection to the Internet.

As noted, the load balancing mechanism is implemented in the FWT 5 in order to determine how to distribute data packets between the backhauls 14 and 16. The load balancing routine in the module 23 on FWT 5 must decide whether an IP packet with an Internet destination should be routed through the backhaul 14 provided by the FWT 5 or through the backhaul 16 provided by the mobile device 5. If the FWT 5 decides to route the packet through the mobile device 12, it will route the packet through the tunnel connection 15 to the mobile device 12. When the mobile device receives the packet, it will forward the packet towards Internet via its backhaul 16. In this case, a NAT traversal needs to be carried out on the mobile device in order to distinguish between different home devices with different LAN IP addresses.

Suitable load balancing mechanisms are known in the art and are found on commercial routers with multiple WAN ports, such as the Linksys RV082 router.

When the Internet load balancing mechanism has been established, the mobile device 12 needs to handle traffic towards Internet from both itself and other home devices. Therefore, a NAT traversal needs to be established towards the backhaul in order to distinguish traffic from/to different devices.

Thus, once the tunnel has been established, packets flowing through the tunnel 15 undergo NAT traversal.

There are various possible scenarios to consider. Assume in FIG. 3 that the laptop 8 with a LAN IP address 192.168.1.2 wishes to send a packet to the Internet 3. In this case, the laptop or PC 8 sends a packet with a source IP address of 192.168.1.2 and a destination address corresponding to WAN IP address of the destination on the Internet. The FWT 5, which is the default gateway, receives this packet from the local network.

Figure 5:
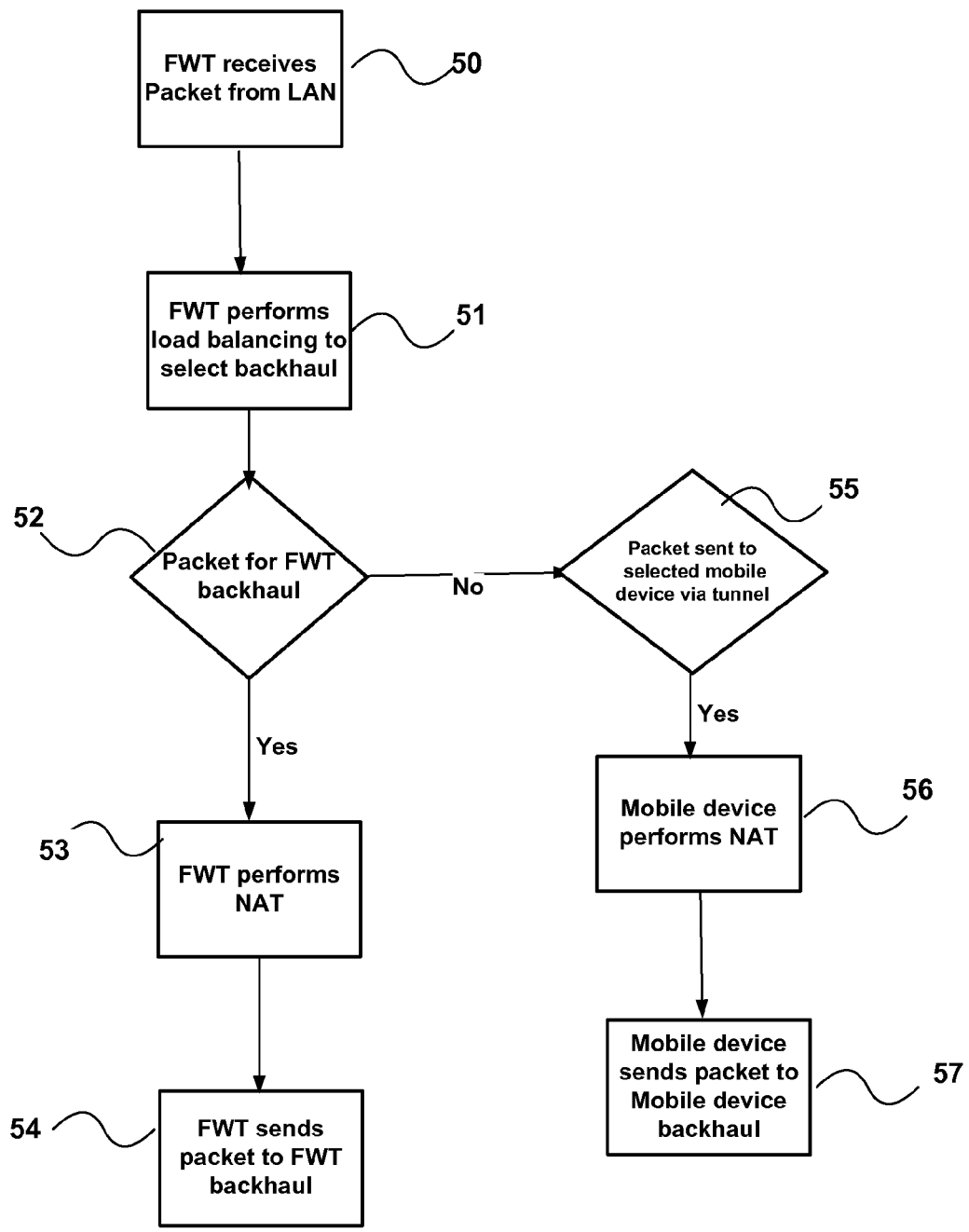
FIG. 5 is a flow chart showing the operation of the system when the fixed wireless terminal receives of a packet from the LAN.

On receipt of the packet at step 50 as shown in FIG. 5, the load balancing module 23 performs its load balancing function at step 51 to decide which backhaul to use. This could be the backhaul 14 of the FWT 5 or the backhaul 16 of the mobile device, or of a particular mobile device if there is more than one. If there is more than one mobile device with public network connectivity, the load balancing module 23 selects the particular mobile device to use at step 51. If the FWT 5 decides to use the backhaul 14 at step 51, a decision will be made at step 52 to forward the packet to be NATed at step 53 using NAT/NAPT functionality within the FWT 5 to change the source address to the WAN IP address of the FWT 5 and to be sent to the backhaul 14 at step 54.

If the load balancing module 23 in the FWT 5 decides to use the backhaul 16 of the one or more of the mobile devices at step 51, a decision is made at step 52 to forward the packet to the selected mobile device via the tunnel, which occurs at step 55. The selected mobile device in turn performs a NAT function at step 56 to replace the source address of the packet, which is the LAN address of laptop 8, by the WAN IP address of the mobile device 12. The mobile device 12 then forwards the packet over its own backhaul 16 at step 57.

After the first Internet IP packet from a particular home device, such as laptop 8, has been routed through the mobile device backhaul, the home network performance can be optimized by routing the next IP packet from the same home device directly over the tunnel 15 to the mobile device 12 if the load balancing mechanism is IP address based. The selected mobile device 12 can be configured to listen to and unpack all Ethernet packets coming from the same home device and forward the subsequent IP packet to its NAT if the destination address matches the previous packet from the tunnel. The reason for this is that each subsequent packet in the same session should have the same addresses and ports. As each session between the particular home device and the server located on the Internet is identified by the source/destination IP address pair and the source/destination port pair, a subsequent packet having the same addresses and ports belongs to the same session. As the mobile device will have changed the source address of the first packet, the source address of the subsequent packets will need to be changed to the same source address (and source port). In this case, the FWT 5 can be configured to discard IP packets with the same source and destination IP address as the packets routed through the tunnel 15 since these packets are forwarded directly to the Internet by the selected mobile device 12.

Figure 6:
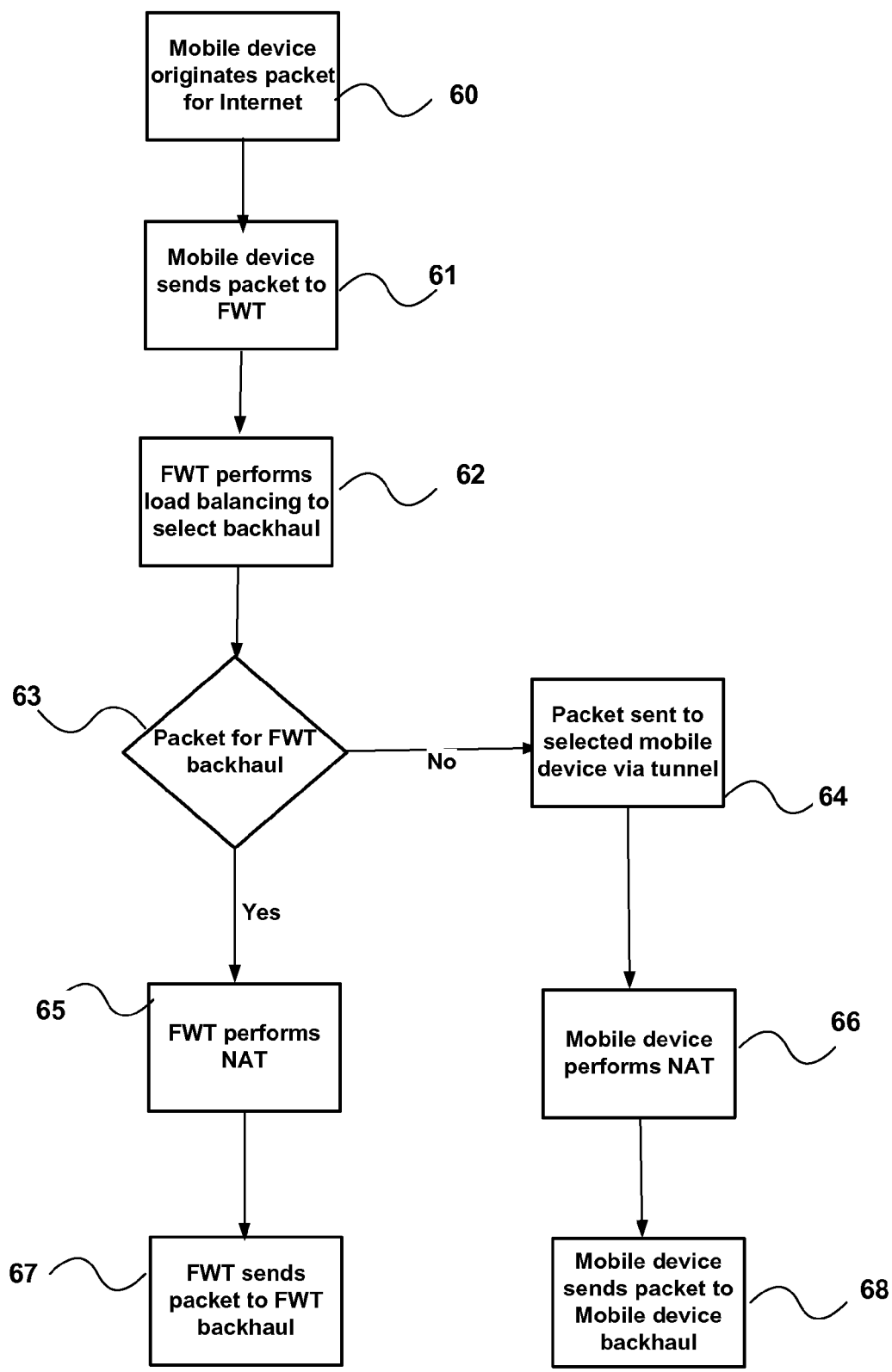
FIG. 6 shows is a flow chart showing the operation of the system when the mobile device originates a packet for the public network.

In an alternative scenario, the mobile device 12 may wish to send a packet originating from its application layers to the Internet 3 as shown in FIG. 6 at step 60. In this case, the mobile device 12 sends the packet over the tunnel 15 to the FWT 5 at step 61 with a source address equal to the LAN IP address of the mobile device and a destination address equal to the WAN IP address of the destination. The FWT 5 performs a load balancing function at step 62 similar that described with reference to FIG. 5 and at step 63 decides which backhaul to use.

If the load balancing module decides to use the FWT backhaul 14, the IP packet is NATed by the FWT at step 65, which substitutes its WAN IP address as the source IP address and forwards the packet to the Internet over the backhaul 14 at step 67. If the load balancing module 23 decides to use the mobile device backhaul 16, the packet is transferred back to the mobile device over the tunnel 15 at step 64, where it is NATed at step 66 to substitute the WAN IP address of the mobile device for the source address before being forwarded at step 68 by the mobile device 12 to the Internet 3 via the backhaul 16.

As discussed above, if the load balancing mechanism is session based, the mobile device 12 can remember the source and destination address in its routing table. Next time a packet from the same session appears on the network, that is a packet with the same source and destination addresses, the packet will be directly routed to the mobile device backhaul in order to optimize performance and ensure that packets with the same source/destination pairs are sent via the same mobile device. In this case, there is no need for the FWT 5 to intervene, and any packets with the same address pairs can be discarded by the FWT 5.

Figure 7:
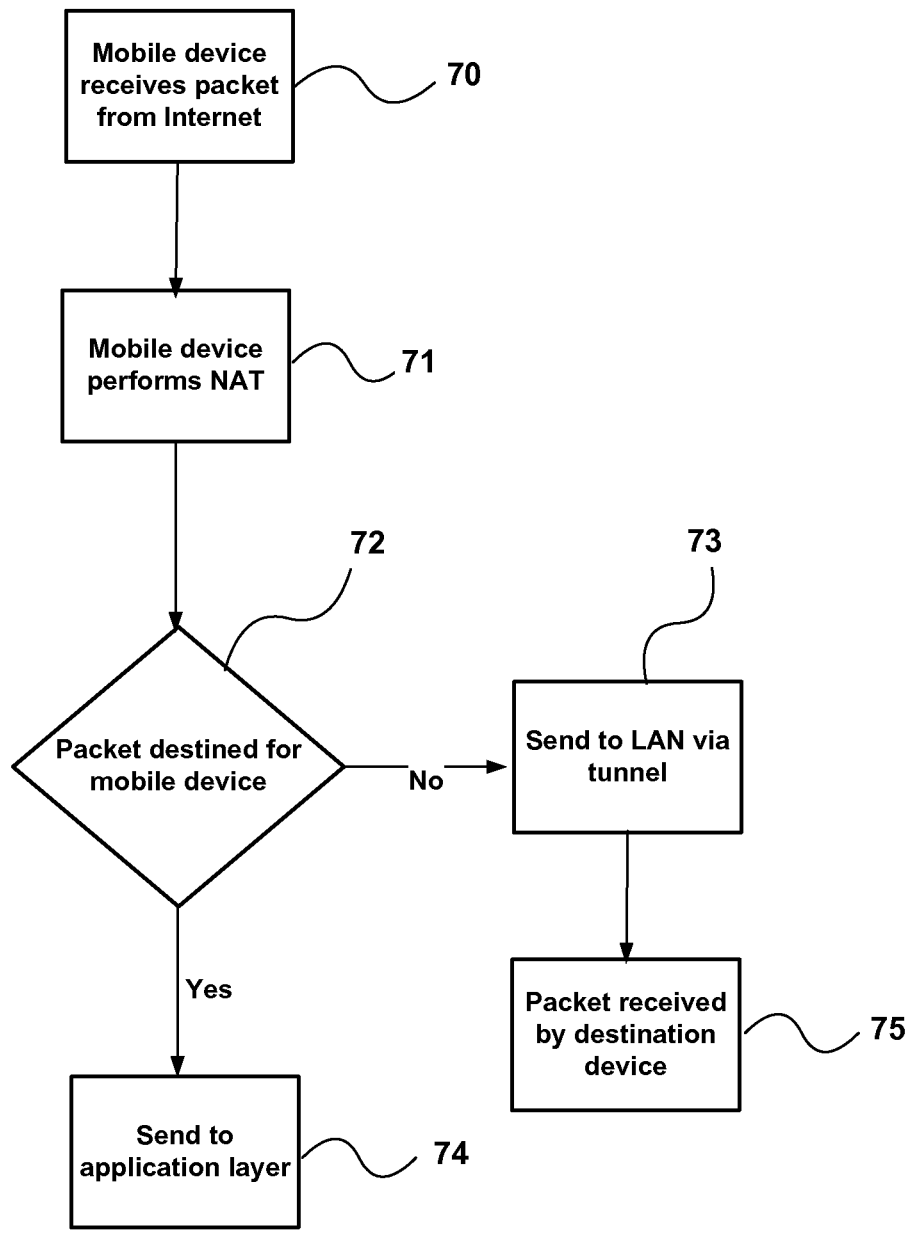
FIG. 7 is a flow chart showing the operation of the system when the mobile device receives a packet from the public network.

In the case of a packet arriving at the mobile device destined for the home network as shown at step 70 in FIG. 7, the mobile device performs network address translation to replace the destination address at step 71, which will initially be the WAN IP address of the mobile device, by the LAN IP address of the destination device. If the mobile device itself is the destination (step 72), the mobile device 12 sends the packet to a higher layer, such as the application layer at step 74. If the destination address is on the home network 1, the mobile device sends the packet through the tunnel 15 to the home network 1 at step 73, where it is received by the destination device, for example, laptop 8 at step 75.

Again, the system performance can be improved by routing an incoming packet directly to the user device in the home network after NAT traversal and analysis of the destination address has been performed.

It will be understood that while the invention has been described in the context of a fixed wireless terminal, it is applicable to other devices, such as routers using a fixed line (e.g. xDSL) as a backhaul connection. In addition, the examples illustrate only a single home device, but the same methods can be applied to multiple home devices. In a similar way, the methods are shown with only a single mobile device. Again, this is neither a limitation of the methods described and the same principles can be used when one or more mobile devices are connected to the FWT 5. In this case, all the backhaul connections can be used to load balance all the traffic from the home network towards the public network, e.g. the Internet.

This invention is not limited to applying load balancing function of Internet traffic between the backhauls but also can be applied for achieving redundant Internet connection using multiple backhauls.

The invention claimed is:

1. A method of providing access to a public packet network from a local environment, comprising:
    establishing a link between a network access device and said public packet network for transferring packets between said network access device and said public packet network;
    establishing a link between said network access device and one or more user devices within said local environment for transferring packets between said network access device and said one or more user devices; and
    establishing a link within said local environment between said network access device and one or more mobile devices capable of establishing wireless communication with said public packet network independently of said network access device,
    wherein said network access device routes at least some traffic flow between said one or more user devices and said public packet network via said one or more mobile devices to increase an effective bandwidth capability of the network access device, and
    wherein said network access device performs load balancing on the traffic flow to determine which packets are routed through said one or more mobile devices and which packets are routed directly to said public packet network.

2. A method as claimed in claim 1, wherein said network access device and said one or more user devices are attached to a local area network (LAN) providing said local environment and each have specific LAN addresses, wherein said one or more mobile devices each have specific WAN addresses on said public packet network, and wherein said one or more mobile devices perform network address translation on packets flowing between said one or more mobile devices and said public packet network to translate between said WAN addresses and said LAN addresses.

3. A method as claimed in claim 1, wherein said link between said network access device and said one or more mobile devices comprises a tunnel established by a tunneling protocol.

4. A method as claimed in claim 3, wherein upon receipt of an incoming packet from the public packet network, said one or more mobile devices determine whether the incoming packet has as a destination address a LAN address of the one or more mobile devices after network address translation, and if so forwards the incoming packet to its application layer, and if not said one or more mobile devices forwards the incoming packet over said tunnel to said LAN for delivery to said one or more user devices with that destination address.

5. A method as claimed in claim 3, wherein upon receipt of a packet from said LAN, said network access device determines whether to forward the packet directly over the link to the public packet network or via one of said one or more mobile devices depending on load considerations, and if said network access device determines that said packet should be forwarded directly over said link to the public packet network, said network access device performs network address translation before forwarding said packet directly over said link, and if said network access device determines that said packet should be forwarded to the public network via one of said one or more mobile devices, said network access device forwards said packet to the mobile device if only one is present, or selects one mobile device if more than one are present and forwards said packet to the selected mobile device, which one mobile device or selected mobile device then performs network address translation prior to forwarding said packet directly to said public packet network.

6. A method as claimed in claim 3, wherein, upon a packet originating from an application layer of said one or more mobile devices, said one or more mobile devices forward the packet to said network access device over said tunnel, wherein said network access device performs a load balancing function to determine whether to forward said packet directly to said public packet network or via said one or more mobile devices, wherein if said network access device decides to forward said packet directly to the public packet network, said network access device performs network address translation and forwards said packet directly to said public packet network, and wherein, if said network access device decides to forward said packet via said one or more mobile devices, said network access device forwards said packet to one mobile device if only one is present, or selects one mobile device if more than one are present and forwards said packet to the selected mobile device, which one mobile device or selected mobile device then performs network address translation before forwarding said packet directly to said public packet network.

7. A method as claimed in claim 1, wherein when said network access device routes a packet to said one or more mobile devices, subsequent packets belonging to a same session are forwarded directly by said one or more mobile devices, and said subsequent packets received by the network access device are discarded.

8. A network access device for providing access to a public packet network from a local environment, comprising:
 a first port configured to establish a link between said network access device and said public packet network for transferring packets between said network access device and said public packet network; and
 a second port configured to establish a link between said network access device and one or more user devices within said local environment for transferring packets between said network access device and said one or more user devices,
 wherein the network access device is configured to establish a link within said local environment between said network access device and a mobile device capable of establishing communication with said public packet network independently of said network access device, and to route at least some traffic flow between said one or more user devices and said public packet network over said link to said mobile device to increase an effective bandwidth capability of the network access device, and
 wherein said network access device is configured to perform load balancing on the traffic flow to determine which packets are routed through said mobile device and which packets are routed directly to said public packet network.

9. A network access device as claimed in claim 8, further comprising a load balancing module configured to perform the load balancing.

10. A network access device as claimed in claim 8, wherein said second port is configured for attachment to a local area network (LAN) providing said local environment and said network access device is configured to run a tunneling protocol to provide said link to said mobile device, and wherein said network access device is configured such that upon receipt of a packet from said LAN, said network access device determines whether to forward the packet directly over the link to the public packet network or via said mobile device depending on load considerations, and if said network access device determines that said packet should be forwarded directly over said link, said network access device performs network address translation before forwarding said packet directly over said link, and if said network access device determines that said packet should be forwarded via said mobile device, said network access device forwards said packet to said mobile device.

11. A network access device as claimed in claim 8, wherein said network access device is further configured to establish links with a plurality of mobile devices, each being capable of independent communication with said public packet network, and wherein said network access device is configured such that when it determines that a packet should be forwarded via a mobile device, it selects one of the mobile devices to which to forward the packet.

12. A mobile device capable of providing auxiliary access to a public packet network from a local environment, the mobile device comprising:
 a transceiver configured to establish a link between said mobile device and said public packet network;
 said mobile device being configured to establish a link within said local environment between said mobile device and a network access device attached to a local area network and a public packet network; and
 a network address translator configured to translate between addresses on said public packet network and said local area network,
 wherein said mobile device is configured to forward packets between the public packet network and said network access device to increase an effective bandwidth capability of the network access device, and
 wherein:
  the network access device is connected to the public packet network via a first backhaul;
  the mobile device is connected to the public packet network via a second backhaul; and
  the mobile device is configured to route a packet from one or more user devices within the local environment to the public packet network via the second backhaul.

13. A mobile device as claimed in claim 12, wherein said link between said mobile device and said network access device comprises a tunnel established by a tunneling protocol.

14. A mobile device as claimed in claim 13, which is configured, upon receipt of an incoming packet from the public packet network, to determine whether the incoming packet has as a destination address after network address translation of an address of the mobile device in the local environment, and if so to forward the incoming packet to the application layer of the mobile device, and if not to forward the incoming packet over said tunnel to a user device with that destination address.

15. The method of claim 1, further comprising:
performing the load balancing, at the network access device, to determine whether to route a packet from the one or more user devices to the public packet network via a first backhaul connected to the network access device, or to route the packet from the one or more user devices to the public packet network via a second backhaul connected to the one or more mobile devices.

16. The method of claim 15, wherein performing the load balancing comprises:
determining whether to route the packet from the one or more user devices to the public packet network via the first backhaul connected to the network access device, or to route the packet from the one or more user devices to the public packet network via the second backhaul connected to the one or more mobile devices, based on a first load of the network access device and a second load of the one or more mobile devices.

17. A mobile device capable of providing auxiliary access to a public packet network from a local environment, the mobile device comprising:
- a transceiver configured to establish a link between said mobile device and said public packet network;
- said mobile device being configured to establish a link within said local environment between said mobile device and a network access device attached to a local area network and a public packet network; and
- a network address translator configured to translate between addresses on said public packet network and said local area network, wherein said mobile device is configured to forward packets between the public packet network and said network access device to increase an effective bandwidth capability of the network access device, and wherein the mobile device is configured to:
receive a packet from the public packet network; and
route the packet received from the public packet network to a user device within the local environment, via the local area network.

* * * * *